(12) United States Patent
Numano

(10) Patent No.: US 7,642,494 B2
(45) Date of Patent: Jan. 5, 2010

(54) LIGHT EMITTING APPARATUS AND METHOD FOR INSPECTING SAME

(75) Inventor: Masaru Numano, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 77 days.

(21) Appl. No.: 12/108,696

(22) Filed: Apr. 24, 2008

(65) Prior Publication Data

US 2008/0265185 A1 Oct. 30, 2008

(30) Foreign Application Priority Data

Apr. 24, 2007 (JP) ............................. 2007-114030

(51) Int. Cl.
*G01J 1/32* (2006.01)
*G02B 27/00* (2006.01)
*H05B 37/02* (2006.01)

(52) U.S. Cl. .................. 250/205; 250/551; 315/149

(58) Field of Classification Search .................. 250/200, 250/205, 551, 214 R, 214 D, 214 LS, 214 LA; 315/149–159, 127, 134; 361/56, 173
See application file for complete search history.

(56) References Cited

FOREIGN PATENT DOCUMENTS

| JP | 07-086902 | 3/1995 |
|---|---|---|
| JP | 3367718 | 3/1995 |
| JP | 3367718 | * 1/2003 |

* cited by examiner

*Primary Examiner*—Georgia Y Epps
*Assistant Examiner*—Jennifer Bennett
(74) *Attorney, Agent, or Firm*—Turocy & Watson, LLP

(57) ABSTRACT

A light emitting apparatus includes: a light emitting device with one terminal connected to a power supply terminal; a voltage detector connected between the power supply terminal and a ground terminal; a driver circuit unit connected between an input terminal receiving a signal as input and the ground terminal; a first switch connected between another terminal of the light emitting device and the driver circuit unit; a second switch connected between the input terminal and the other terminal of the light emitting device; and a switch controller. The switch controller is operable to perform an operation mode in which the first switch is connected and the second switch is disconnected in response to an output from the voltage detector having detected that a power supply voltage applied to the power supply terminal is within a range from a first voltage to a second voltage, and to perform an inspection mode in which the first switch is disconnected and the second switch is connected in response to an output from the voltage detector having detected that the power supply voltage is outside the range from the first voltage to the second voltage.

20 Claims, 9 Drawing Sheets

LIGHT EMITTING APPARATUS AND METHOD FOR INSPECTING SAME

CROSS-REFERENCE TO RELATED APPLICATIONS

This application is based upon and claims the benefit of priority from the prior Japanese Patent Application No. 2007-114030, filed on Apr. 24, 2007; the entire contents of which are incorporated herein by reference.

BACKGROUND OF THE INVENTION

1. Field of the Invention

This invention relates to a light emitting apparatus and a method for inspecting the same.

2. Background Art

In a photocoupler capable of transmitting signals under the insulated condition between power supply systems, an input electrical signal is converted to an optical signal by a semiconductor light emitting device. Here, a control circuit for driving the semiconductor light emitting device is often incorporated in the photocoupler.

If the light emitting device incorporated in the photocoupler can be precisely inspected, photocouplers with uniform characteristics are obtained, and the reliability can be also improved.

Japanese Patent No. 3367718 discloses a technique for inspecting optical coupling efficiency, in which a current is passed through the light emitting device by a current bypass circuit to measure the output of the light receiver when the power supply voltage does not reach the guaranteed operating range.

SUMMARY OF THE INVENTION

According to an aspect of the invention, there is provided a light emitting apparatus including: a light emitting device with one terminal connected to a power supply terminal; a voltage detector connected between the power supply terminal and a ground terminal; a driver circuit unit connected between an input terminal receiving a signal as input and the ground terminal; a first switch connected between another terminal of the light emitting device and the driver circuit unit; a second switch connected between the input terminal and the other terminal of the light emitting device; and a switch controller operable to perform an operation mode in which the first switch is connected and the second switch is disconnected in response to an output from the voltage detector having detected that a power supply voltage applied to the power supply terminal is within a range from a first voltage to a second voltage, and to perform an inspection mode in which the first switch is disconnected and the second switch is connected in response to an output from the voltage detector having detected that the power supply voltage is outside the range from the first voltage to the second voltage.

According to another aspect of the invention, there is provided a light emitting apparatus including: a light emitting device with one terminal connected to a power supply terminal; a voltage detector connected between the power supply terminal and a ground terminal; a driver circuit unit connected between an input terminal receiving a signal as input and the ground terminal; a first switch connected between another terminal of the light emitting device and the driver circuit unit; a second switch connected between the input terminal and the other terminal of the light emitting device; and a switch controller operable to perform an operation mode in which the first switch is connected and the second switch is disconnected in response to an output from the voltage detector having detected that a power supply voltage applied to the power supply terminal is within a range from a first voltage to a second voltage, and to perform an inspection mode in which the first switch is disconnected and the second switch is connected in response to an output from the voltage detector having detected that the absolute value of the power supply voltage is higher than the absolute values of the first and the second voltage.

According to another aspect of the invention, there is provided a method for inspecting a light emitting apparatus in which a light emitting device can be driven by a driver circuit in response to a signal from an input terminal, the method including: disconnecting the driver circuit from the light emitting device when a power supply voltage applied to a power supply terminal is outside a range from a first voltage to a second voltage; connecting the light emitting device between the input terminal and the power supply terminal; and detecting an operating current of the light emitting device via the input terminal.

DETAILED DESCRIPTION OF THE INVENTION

Figure 1:
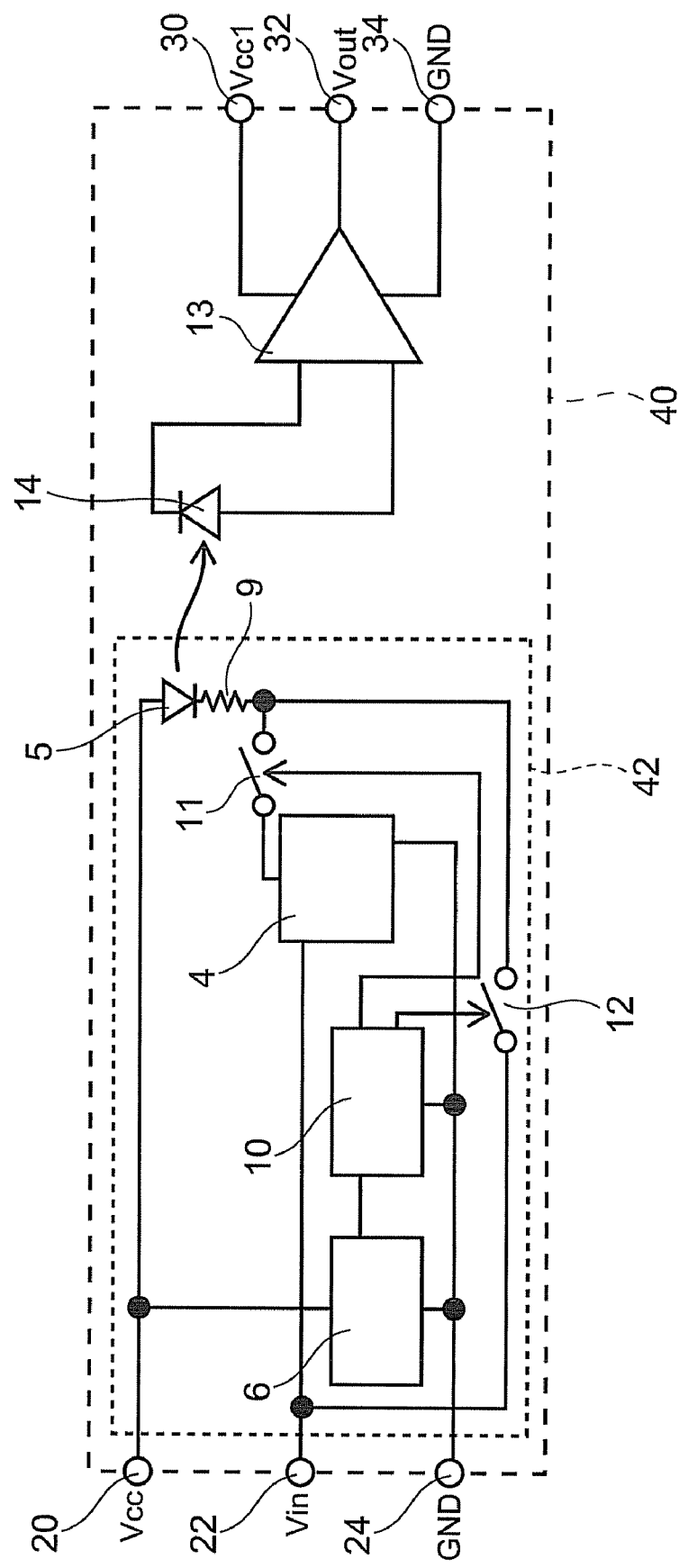
FIG. 1 is a block diagram illustrating a light emitting apparatus according to an embodiment of the invention.

FIG. 1 illustrates a light emitting apparatus according to an embodiment of the invention. This figure illustratively shows a photocoupler 40, but the invention is not limited thereto. On the input side, a power supply (hereinafter Vcc) terminal 20, an input (hereinafter Vin) terminal 22, and a ground (hereinafter GND) terminal 24 are provided. On the output side, a power supply (hereinafter Vcc1) terminal 30, an output (hereinafter Vout) terminal 32, and a ground (hereinafter GND) terminal 34 are provided.

The Vcc terminal 20 is connected to a voltage detector 6 and the anode of a light emitting device 5. An input digital signal composed of "0" and "1" is inputted to a driver circuit unit 4 through the Vin terminal. The output of the driver circuit unit 4 is outputted to one of the terminals of a first switch 11. The output of the voltage detector 6 is inputted to a switch controller 10.

The resistor 9 connected to the cathode of the light emitting device 5 is connected to the other terminal of the first switch 11 and one of the terminals of a second switch 12. The other terminal of the second switch 12 is connected to the Vin terminal 22. The first and second switch 11, 12 are turned on or off by the switch controller 10. If the first and second switch 11, 12 are MOSFETs, they can be easily turned on or off by using the switch controller 10 to control their gate voltage.

The driver circuit unit 4, the voltage detector 6, and the switch controller 10 are connected to the common GND terminal 24. The circuit including the light emitting device 5, the driver circuit unit 4, the voltage detector 6, the switch controller 10, the first and second switch 11, 12, and the resistor 9 is hereinafter referred to as a light emitting device control circuit 42.

The signal converted to light by the light emitting device 5 under the control of the light emitting device control circuit 42 is converted to an electrical signal by a photodiode 14. The photodiode 14 and a light receiving IC 13 constitute a light receiving circuit. The output of the light receiving IC 13 is extracted outside from the Vout terminal 32. Thus signal transmission is made possible under the insulated condition between power supply systems, and is used in industrial and electronic equipment.

Figure 2:
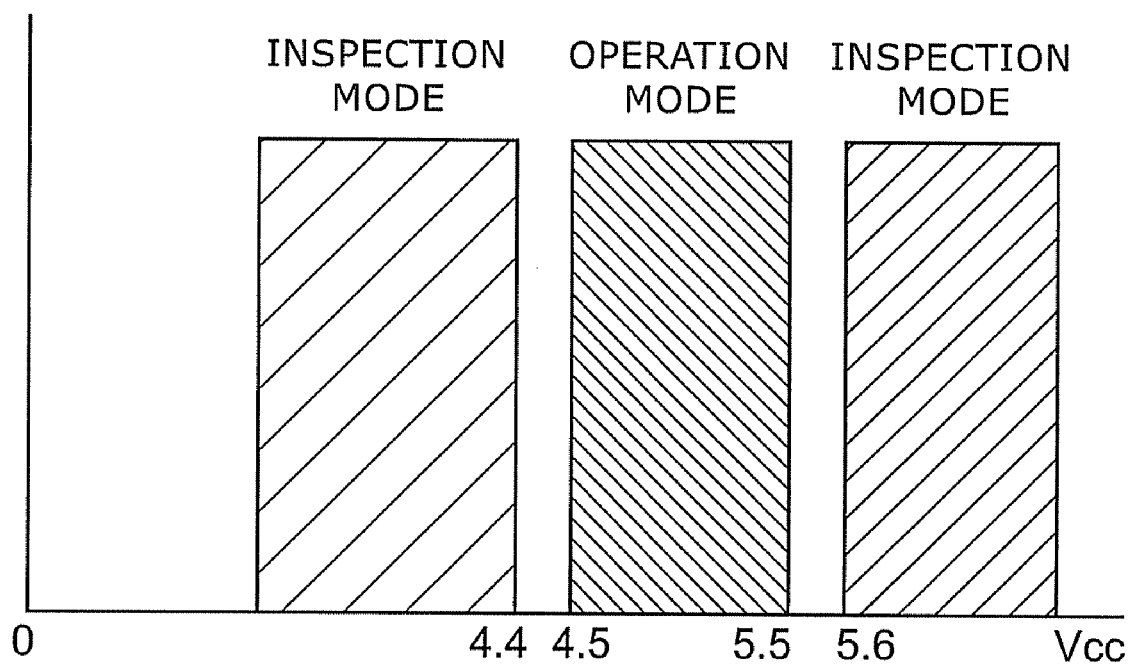
FIG. 2 is a view showing an operation mode and an inspection mode.

FIG. 2 shows mode switching in the photocoupler 40 by the power supply voltage Vcc. Typically, the guaranteed operating range of the photocoupler 40 is 4.5 to 5.5 V, for example, serving for the operation mode. On the other hand, the power supply voltage range of 4.4 V or less or 5.6 V or more, for example, serves for the inspection mode. The "operation mode" is the mode of performing the operation of the photocoupler 40 for transmitting signals. The "inspection mode" is the mode of performing inspection such as independently measuring the characteristics of the light emitting device 5 constituting the photocoupler 40. If the inspection mode range is set below the guaranteed operating range, the inspection mode can be performed without passing through the operation mode when the power supply voltage is increased from zero. However, it is often the case that a high-speed LED has a high operating voltage. Hence, if the breakdown voltage in the device manufacturing process can be increased, it is more preferable to allow the inspection mode range to be set also above the guaranteed operating range.

Figure 3:
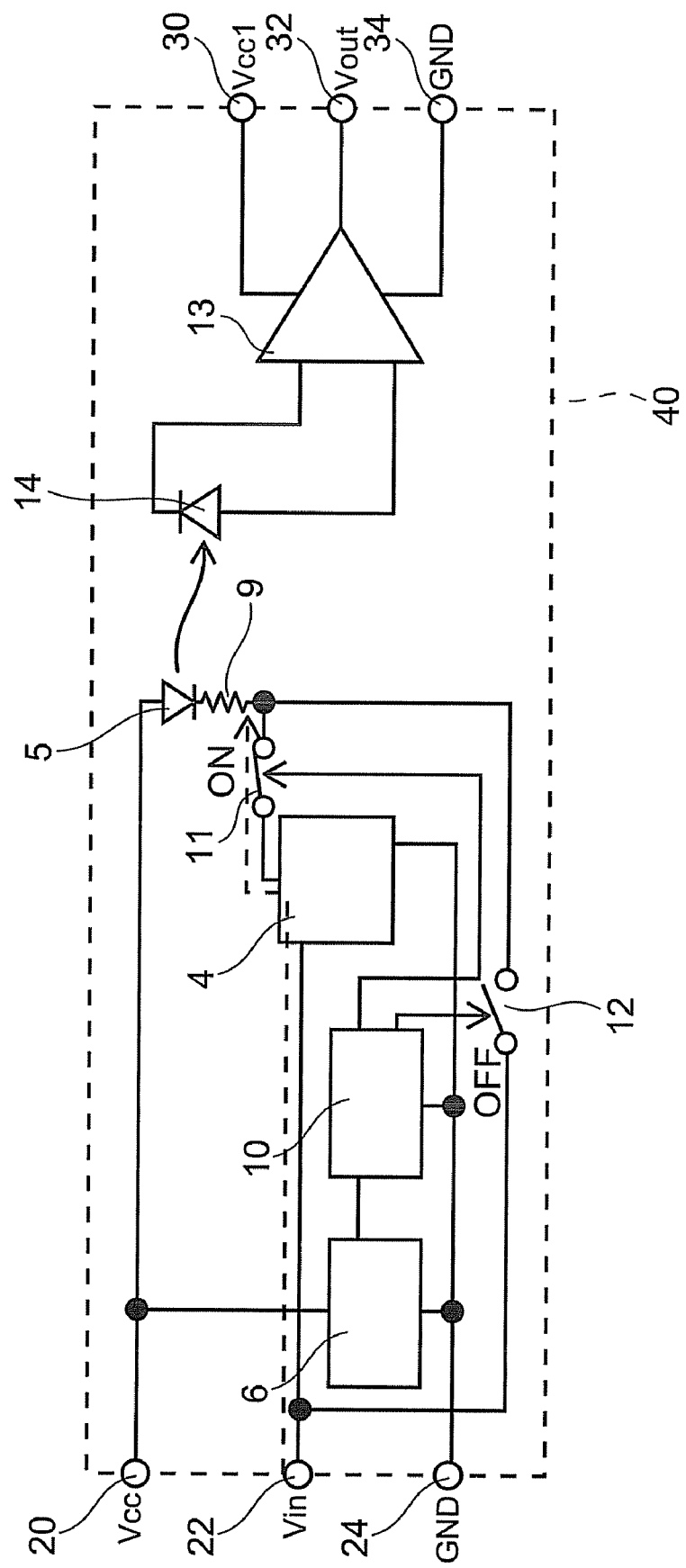
FIG. 3 is a block diagram illustrating the operation mode of the embodiment.

FIG. 3 is a block diagram for illustrating the operation mode within the guaranteed operating range in which a voltage of 4.5 to 5.5 V is applied to the light emitting device 5. The voltage detector 6 detects the voltage at the Vcc terminal 20. If it is in the range of 4.5 to 5.5 V, the first switch 11 is turned on, and the second switch 12 is turned off. In this case, the driver circuit unit 4 forces the input signal from the Vin terminal 22 to traverse the path of the dashed arrow in FIG. 3, thereby driving the light emitting device 5.

Figure 4:
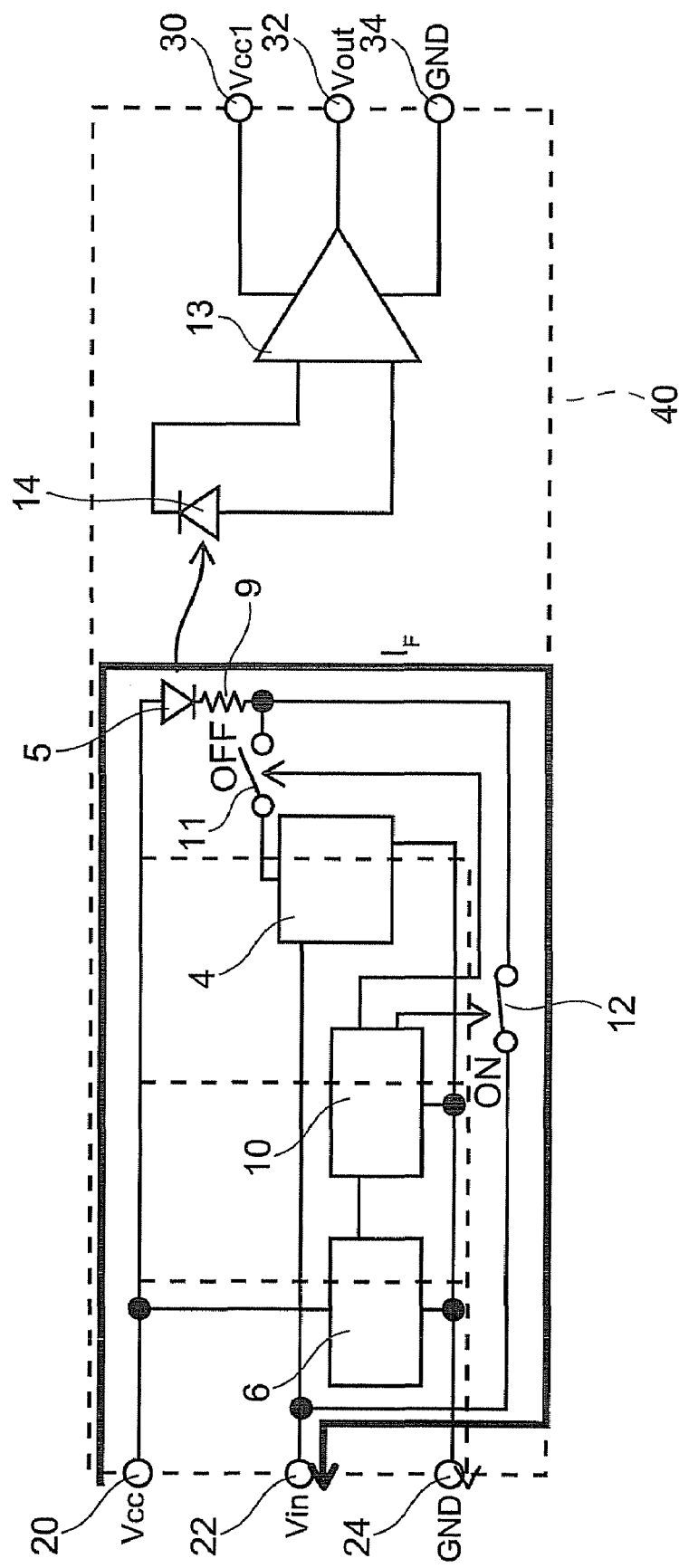
FIG. 4 is a block diagram illustrating the inspection mode of the embodiment.
Figure 5:
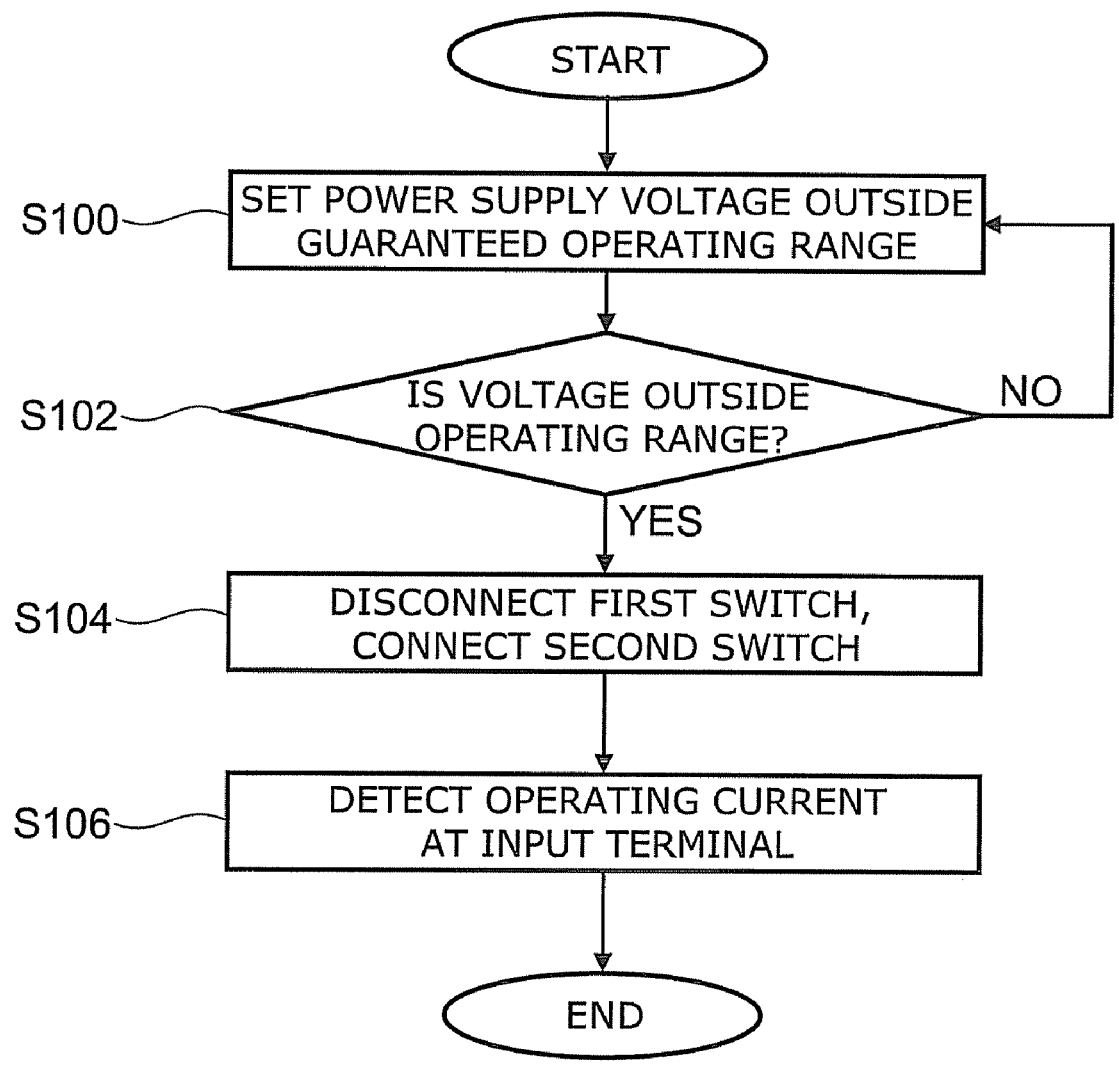
FIG. 5 is a flow chart of the inspection method.

FIG. 4 is a block diagram for illustrating a method for inspecting the light emitting apparatus in which a power supply voltage outside the guaranteed operating range is applied to the light emitting device 5, and FIG. 5 is a flow chart thereof. First, to enter the inspection mode, the power supply voltage is set outside the guaranteed operating range, e.g. to 6.0 V (step S100). If the voltage detector 6 determines that the voltage at the Vcc terminal 20 is outside the guaranteed operating range (step S102), the first switch 11 is turned off, and the second switch 12 is turned on, thereby disconnecting the driver circuit unit 4 from the light emitting device 5 (step S104). If the power supply voltage is within the operating range, control returns to S100 to perform a reset operation.

As shown in FIG. 4, the light emitting device 5 and the resistor 9 are interposed between the Vcc terminal 20 and the Vin terminal 22. In this case, at the Vin terminal 22, it is possible to accurately detect the operating current $I_F$ shown by the solid line, which does not include the current shown by the dashed line flowing in from the Vcc terminal 20, traversing the circuits such as the voltage detector 6, the driver circuit unit 4, and the switch controller 10, and flowing out of the GND terminal 24.

Figure 6:
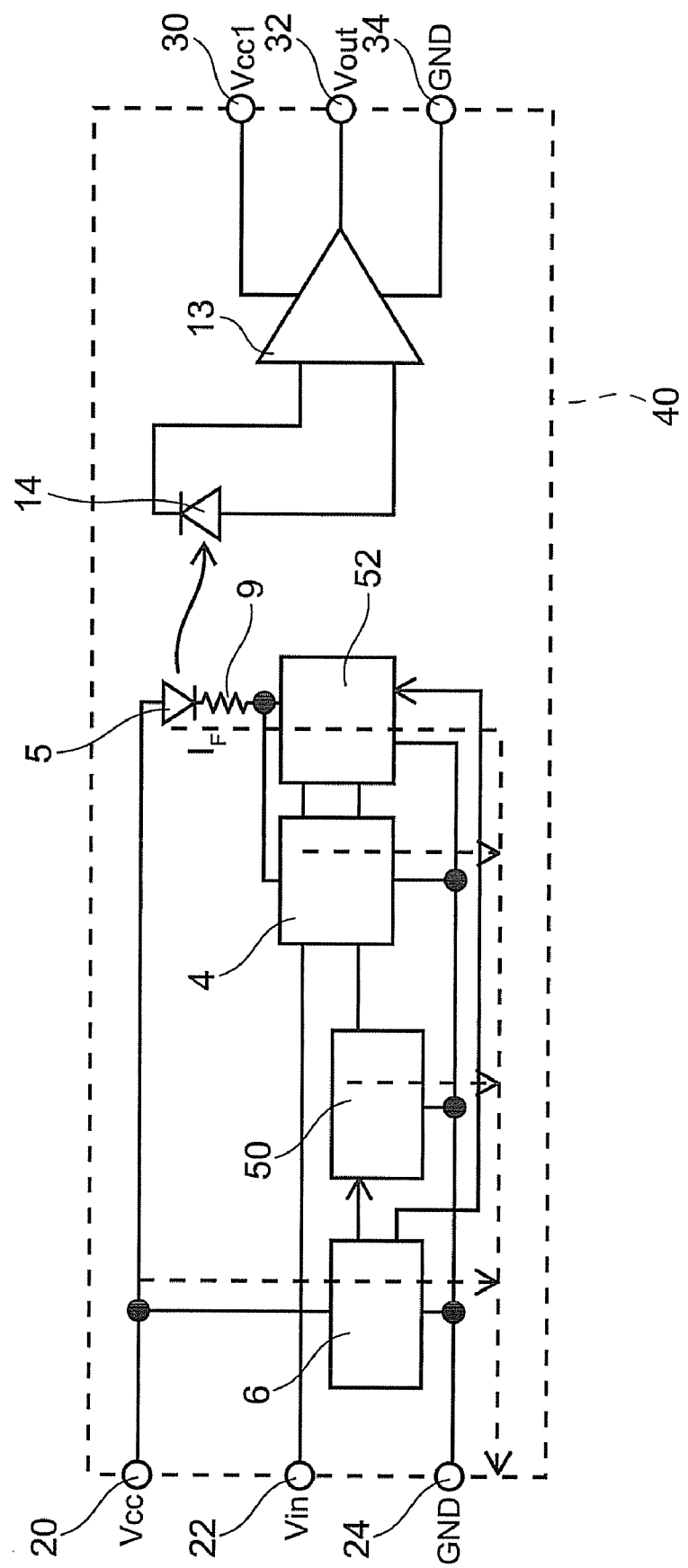
FIG. 6 is a block diagram illustrating a light emitting apparatus according to a comparative example.

FIG. 6 is a block diagram of a light emitting apparatus according to a comparative example. In this comparative example, if the power supply voltage at the Vcc terminal 20 is lower than the guaranteed operating range, the voltage detector 6 turns on a driver disabling circuit 50 and a current bypass circuit 52. Thus the driver circuit unit 4 is turned off, and the operating current $I_F$, which has passed through the light emitting device 5 and the resistor 9, traverses the current bypass circuit 52 and flows out of the GND terminal 24. In the comparative example, the current flowing through the voltage detector 6, the driver disabling circuit 50, and the driver circuit unit 4 also flows out of the common GND terminal 24. Thus the operating current $I_F$ of the light emitting device 5 is not decoupled, and the efficiency of the light emitting device 5 cannot be measured precisely.

In contrast, in this embodiment, the operating current $I_F$ flows between the Vcc terminal 20 and the Vin terminal 22 without traversing the GND terminal 24. Hence the current traversing the voltage detector 6, the switch controller 10, and the driver circuit unit 4 and flowing out of the GND terminal 24 can be decoupled, and the operating current $I_F$ can be measured precisely in the inspection mode.

The light emitting device 5, which emits visible to infrared light, has a large chip-to-chip variation in its initial characteristics, and degradation due to continuous operation may also occur. In such cases, this embodiment can independently inspect the characteristics of the light emitting device 5 even in the case where it is combined with a control circuit as in the photocoupler 40. Addition of a new measurement terminal would enlarge the configuration of the photocoupler 40. However, in this embodiment, the light emitting device 5 can be measured precisely without increasing the terminals, facilitating downsizing.

Because the Vin terminal 22 is independent of the GND terminal 24, it is easily achieved to inspect the light emitting device 5 by applying thereto a voltage higher than the guaranteed operating range, for example.

Figure 7:
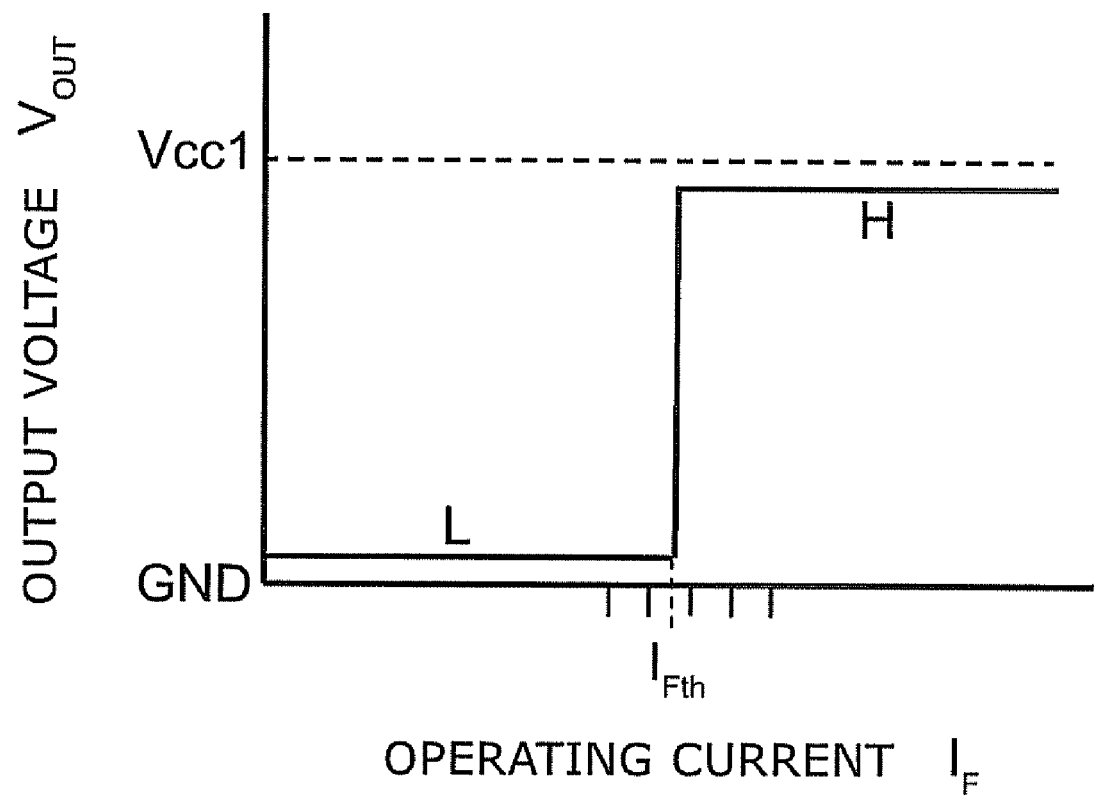
FIG. 7 is a view illustrating the turn-on of a photocoupler.

FIG. 7 illustrates the output change point of the light receiving IC 13 in the photocoupler 40. The output Vout of the light receiving IC 13 represented on the vertical axis is turned on from the L level to the H level when the operating current $I_F$ represented on the horizontal axis exceeds a threshold $I_{Fth}$. Here, for example, the H level is set slightly lower than Vcc1, and the L level is set slightly higher than zero, i.e., ground potential.

In the inspection mode, the operating current $I_F$ is digitally and gradually increased, and the operating current $I_F$ at which Vout is turned on is determined. Thus the relative value of the power efficiency of the light emitting device 5 can be found. Because of distribution or dispersion in its initial characteristics, the light emitting device 5 has a distributed power efficiency. Hence, preferably, the power efficiency can be measured precisely in the inspection step. The power efficiency is defined as the number of photons divided by DC input electrical power.

In this case, even if the output of the light receiving IC 13 is digital, the power efficiency of the light emitting device 5 can be easily determined by varying the operating current $I_F$ and detecting the output change point of the light receiving IC 13. While FIG. 6 shows the turn-on operation, the light emitting device control circuit 42 and the input signal can be adapted to allow the operating current $I_F$ to be turned off upon exceeding $I_{Fth}$. Furthermore, from this output change point, the coupling efficiency between the light emitting device 5 and the light receiving IC 13 can be determined.

The foregoing is described with reference to the photocoupler 40. However, the invention is not limited thereto. For example, in an optical data link, the operating current $I_F$ is precisely measured by turning on or off the switches provided in the light emitting device control circuit 42 to allow the operating current $I_F$ to bypass the GND terminal. Thus the power efficiency of the light emitting device 5 and the coupling efficiency of the optical data link can be determined.

Figure 8:
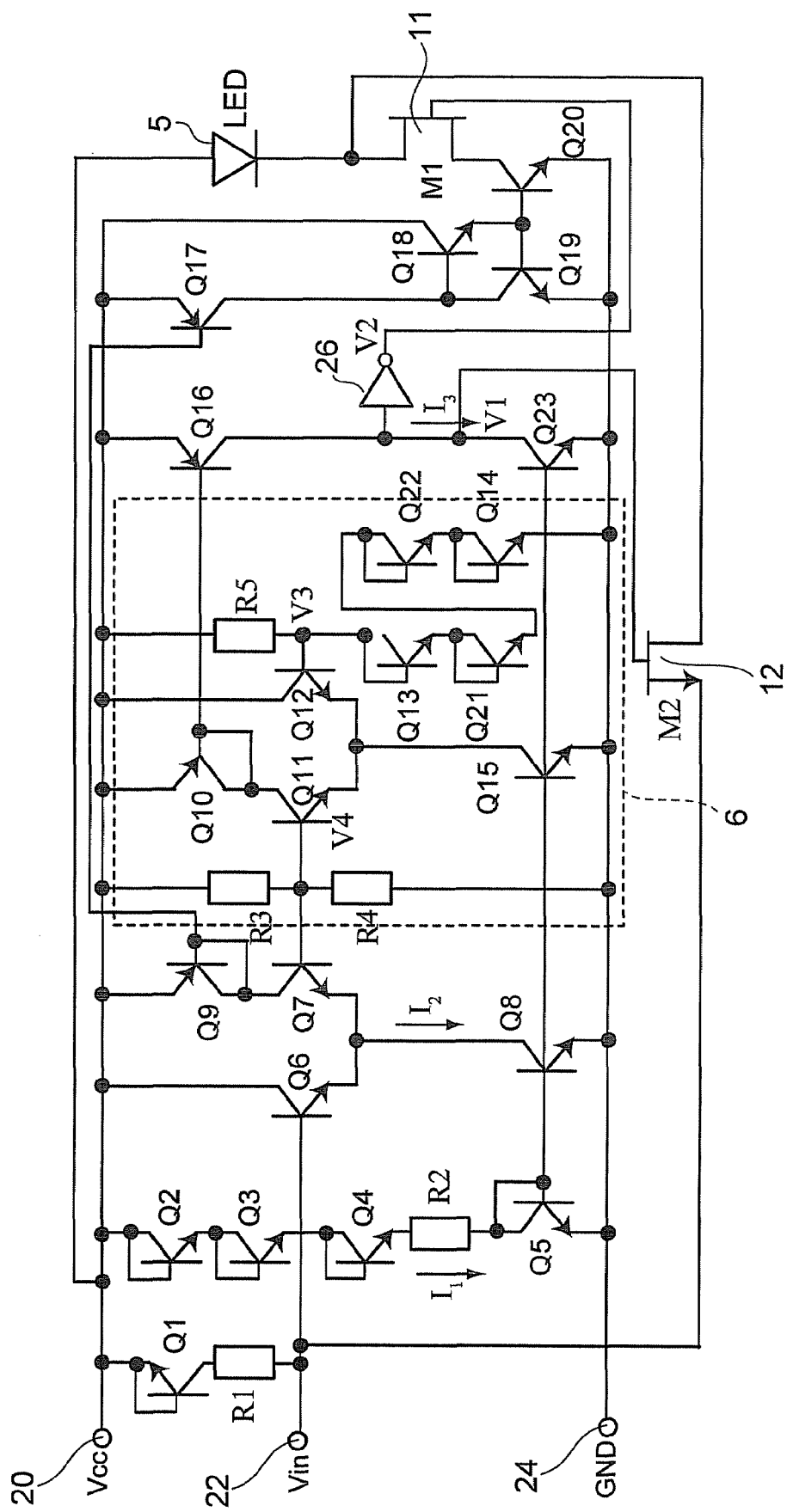
FIG. 8 is a circuit diagram of the light emitting apparatus according to the embodiment.

FIG. 8 is a circuit diagram showing the light emitting device control circuit 42 according to this embodiment. The portion indicated by the dashed line constitutes the voltage detector 6 of this embodiment. The potential V3 is $4V_{BE}$, which is produced by the series connection of four collector-base connected transistors Q13, Q21, Q22, and Q14. V4 is determined by the division of Vcc by R3 and R4. If $V_{BE}$ is 0.7 V, then Vcc>$4V_{BE}$=2.8 V, and I1, I2, and I3 flow through Q5, Q8, and Q23, respectively, initiating the operation mode.

V4 is determined by the division of Vcc by R3 and R4. If V4<V3, then V1 can be set to the L level, and the output V2 of the NOT circuit 26 is at the H level, i.e., generally at the potential of Vcc. Hence the first switch 11 (M1) is turned on, and the second switch 12 (M2) is turned off, allowing the operation mode to be activated. In this case, if R3=R4, for example, then Vcc<$4V_{BE}$×2=2.8×2=5.6 V. Thus if Vcc<5.6 V, then V4<V3, and the operation mode can be activated.

On the other hand, if Vcc≧5.6 V, then V4≧V3. Thus V1 is at the H level, and the output V2 of the NOT circuit 26 is at the L level, i.e., generally at GND potential. Hence the first switch 11 is turned off, and the second switch 12 is turned on, allowing the inspection mode to be activated. It is noted that, if the first and second switch 11, 12 are MOSFETs, they can be complementarily turned on and off by the NOT circuit 26, facilitating control.

In the embodiment of FIG. 8, if the power supply voltage Vcc is within the guaranteed operating range, the signal input from the Vin terminal 22 is transmitted to the collector of the transistor Q20, and the light emitting device 5 is driven. On the other hand, if the power supply voltage is outside the guaranteed operating range, the first switch 11 is turned off, and the second switch 12 is turned on. Thus the operating current $I_F$ of the light emitting device 5 does not traverse the voltage detector, the driver circuit unit, and the switch controller and directly flows to the Vin terminal 22. Hence the operating current $I_F$ of the light emitting device 5, which does not include the current flowing to the GND line, can be detected accurately.

Figure 9:
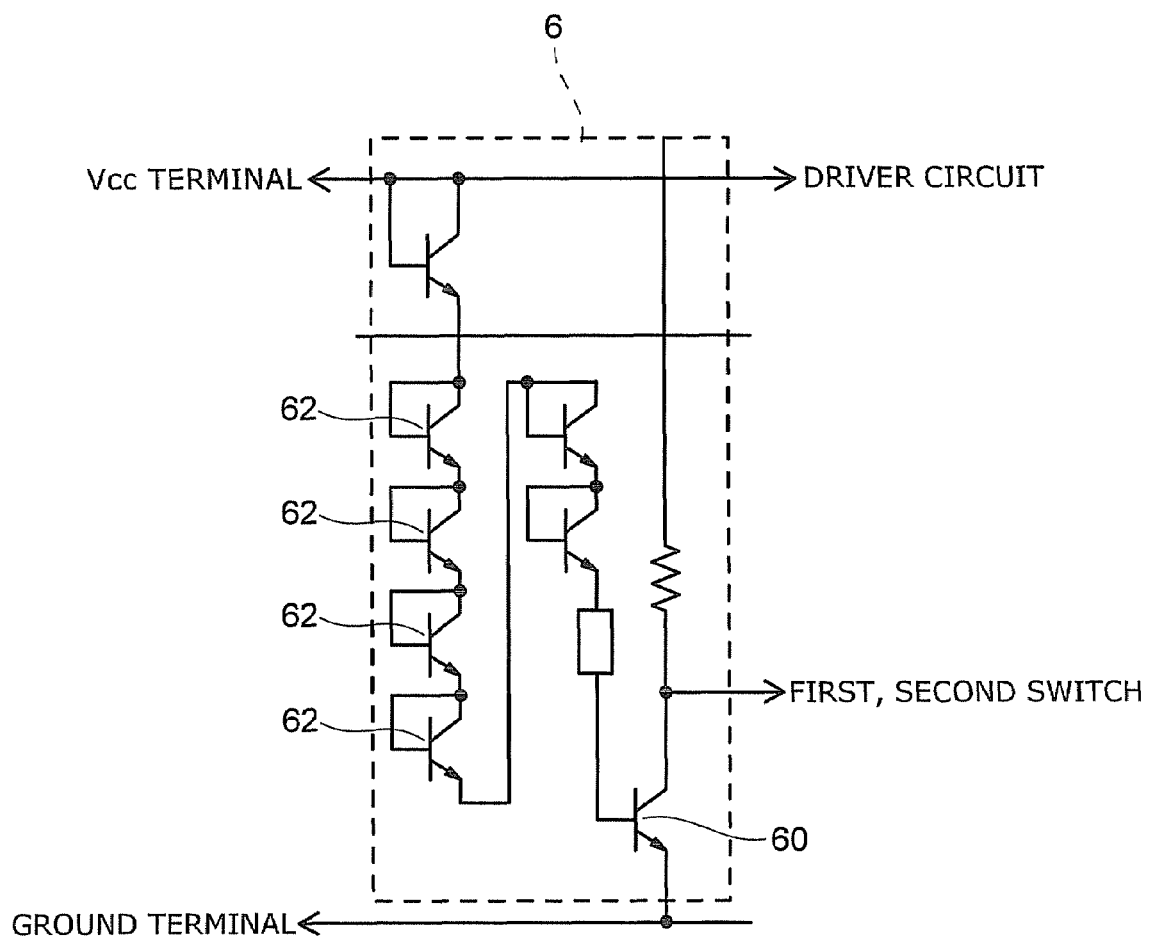
FIG. 9 is a circuit diagram of a voltage detector.

FIG. 9 is a circuit diagram showing the voltage detector 6 in the case where the power supply voltage Vcc is lower than the guaranteed operating range. In this case, a transistor 60 is interposed between the Vcc terminal 20 and the ground terminal 24 to detect voltage. For example, if seven series-connected diodes (in FIG. 9, diode-connected transistors 62) are interposed between the Vcc terminal 20 and the base of the transistor 60, the transistor 60 can be turned off at approximately 3.7 V or less, and its collector potential can be used to control the switch controller 10, allowing the inspection mode to be activated.

The embodiment of the invention has been described with reference to the drawings. However, the invention is not limited thereto. For example, the above embodiment is described in the case where the power supply voltage Vcc is positive. However, conversely, the power supply voltage Vcc may be negative. This can be achieved by, for example, reversing the conductivity type of semiconductors constituting the light emitting device, the light receiving device, and the control circuit. Furthermore, the arrangement and configuration of the voltage detector, the driver circuit unit, the switch controller, the light emitting device, and the switches constituting the invention can be modified by those skilled in the art without departing from the spirit of the invention, and such modifications are also encompassed within the scope of the invention.

The invention claimed is:

1. A light emitting apparatus comprising:
   a light emitting device with one terminal connected to a power supply terminal;
   a voltage detector connected between the power supply terminal and a ground terminal;
   a driver circuit unit connected between an input terminal receiving a signal as input and the ground terminal;
   a first switch connected between another terminal of the light emitting device and the driver circuit unit;
   a second switch connected between the input terminal and the other terminal of the light emitting device; and
   a switch controller operable to perform an operation mode in which the first switch is connected and the second switch is disconnected in response to an output from the voltage detector having detected that a power supply voltage applied to the power supply terminal is within a range from a first voltage to a second voltage, and to perform an inspection mode in which the first switch is disconnected and the second switch is connected in response to an output from the voltage detector having detected that the power supply voltage is outside the range from the first voltage to the second voltage.

2. The light emitting apparatus according to claim 1, wherein the driver circuit unit drives the light emitting device on the basis of a digital electrical signal inputted to the input terminal in the operation mode, allowing the digital electrical signal to convert to a digital light signal.

3. The light emitting apparatus according to claim 1, wherein a range of the power supply voltage to perform the inspection mode and a range of the power supply voltage to perform the operation mode are discontinuous.

4. The light emitting apparatus according to claim 1, wherein absolute values of the first and the second voltage are lower than or equal to 5.5 volts.

5. The light emitting apparatus according to claim 1, further comprising:
   a light receiving circuit having an output terminal, an output side power supply terminal and an output side ground terminal,
   a power supply at an input side and a power supply at an output side are able to be electrically isolated.

6. The light emitting apparatus according to claim 1, wherein the light emitting device is capable of emitting light in a range of wavelength from visible to infrared light.

7. The light emitting apparatus according to claim 1, wherein the absolute value of the power supply voltage to perform the inspection mode is smaller than the absolute values of the first and the second voltage.

8. The light emitting apparatus according to claim 7, wherein the first switch is a first transistor, and the second switch is a second transistor.

9. The light emitting apparatus according to claim 8, wherein
   the voltage detector includes a plurality of series-connected diodes and a third transistor,
   the plurality of series-connected diodes are directly connected between the power supply terminal and the base of the third transistor,
   the emitter of the third transistor is connected to the ground terminal, and
   the collector of the third transistor applies an output to activate the inspection mode to the switch controller.

10. The light emitting apparatus according to claim 9, wherein the switch controller controls each of the first and the second transistors so that the first and the second transistors are complementarily connected and disconnected.

11. The light emitting apparatus according to claim 8, wherein the first and the second transistors are MOSFETs.

12. A light emitting apparatus comprising:
- a light emitting device with one terminal connected to a power supply terminal;
- a voltage detector connected between the power supply terminal and a ground terminal;
- a driver circuit unit connected between an input terminal receiving a signal as input and the ground terminal;
- a first switch connected between another terminal of the light emitting device and the driver circuit unit;
- a second switch connected between the input terminal and the other terminal of the light emitting device; and
- a switch controller operable to perform an operation mode in which the first switch is connected and the second switch is disconnected in response to an output from the voltage detector having detected that a power supply voltage applied to the power supply terminal is within a range from a first voltage to a second voltage, and to perform an inspection mode in which the first switch is disconnected and the second switch is connected in response to an output from the voltage detector having detected that the absolute value of the power supply voltage is higher than the absolute values of the first and the second voltage.

13. The light emitting apparatus according to claim 12, wherein the first switch is a first transistor, and the second switch is a second transistor.

14. The light emitting apparatus according to claim 13, wherein the voltage detector compares a first potential determined by resistance division between the power supply terminal and the ground terminal with a second potential determined by a forward drop voltage of a plurality of series-connected diodes, and applies an output to activate the inspection mode to the switch controller when the absolute value of the first potential is higher than the absolute value of the second potential.

15. The light emitting apparatus according to claim 14, wherein the switch controller controls each of the first and the second transistors in response to the output from the voltage detector so that the first and the second transistors are complementarily connected or disconnected.

16. The light emitting apparatus according to claim 13, wherein the first and the second transistor are MOSFETs.

17. A method for inspecting a light emitting apparatus in which a light emitting device can be driven by a driver circuit in response to a signal from an input terminal, the method comprising:
- disconnecting the driver circuit from the light emitting device when a power supply voltage applied to a power supply terminal is outside a range from a first voltage to a second voltage;
- connecting the light emitting device between the input terminal and the power supply terminal; and
- detecting an operating current of the light emitting device via the input terminal.

18. The method for inspecting a light emitting apparatus according to claim 17, wherein
- the light emitting apparatus further includes a light receiving circuit, and
- the operating current of the light emitting device is varied to detect a threshold current at which an output signal of the light receiving circuit is turned on or turned off.

19. The method for inspecting a light emitting apparatus according to claim 18, wherein the operating current is varied digitally.

20. The method for inspecting a light emitting apparatus according to claim 18, wherein a relative power efficiency is determined by dividing a number of photons emitted from the light emitting device by DC input electrical power to the light emitting device.

* * * * *